Sept. 11, 1962 J. R. URSCHEL ET AL 3,053,296
METHOD OF AND APPARATUS FOR SLITTING BEANS
Filed July 19, 1956 7 Sheets-Sheet 1

INVENTORS.
Joe R. Urschel and
Gerald W. Urschel
By
Atty.

Sept. 11, 1962 J. R. URSCHEL ET AL 3,053,296
METHOD OF AND APPARATUS FOR SLITTING BEANS
Filed July 19, 1956 7 Sheets-Sheet 2
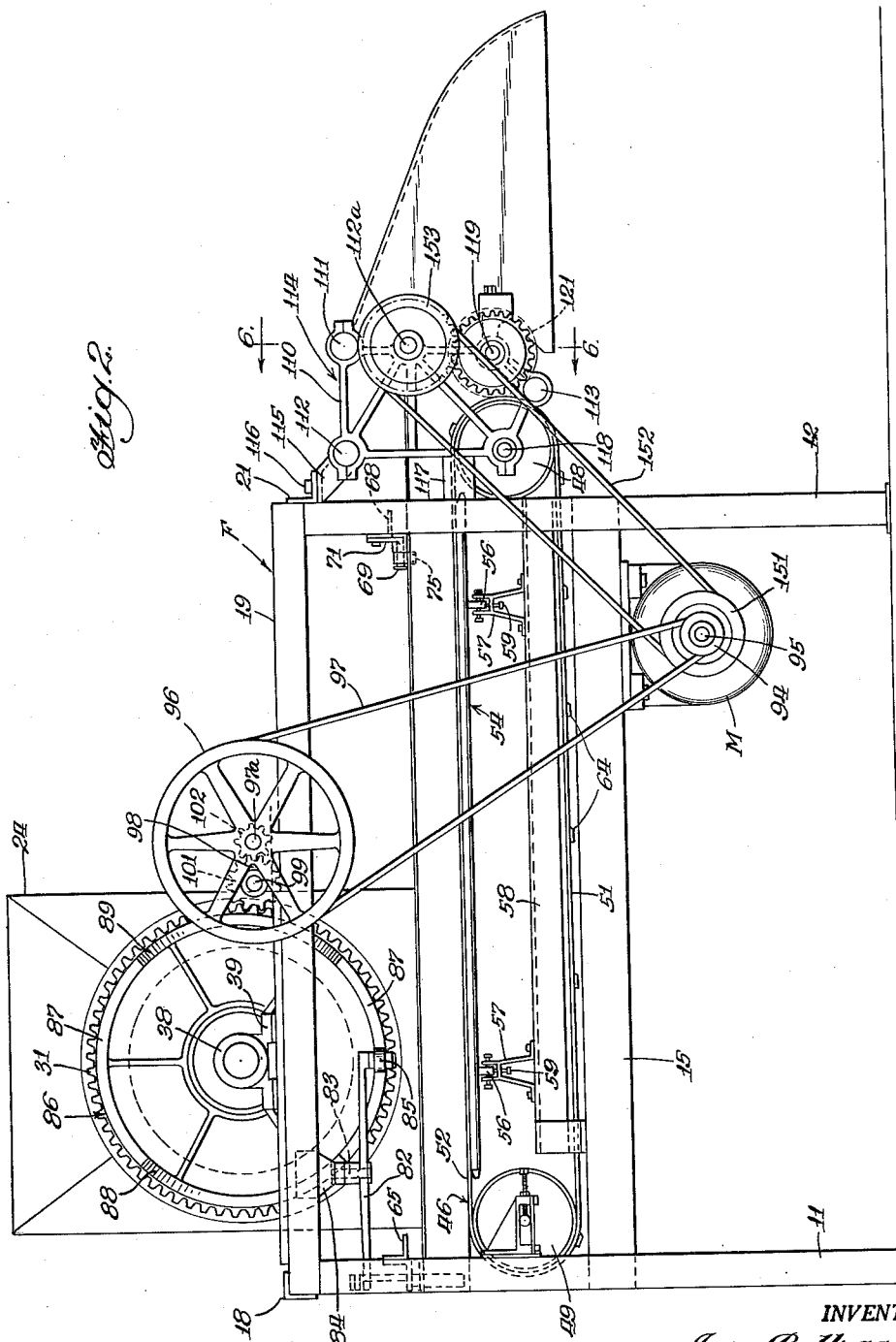
INVENTORS.
Joe R. Urschel and
Gerald W. Urschel

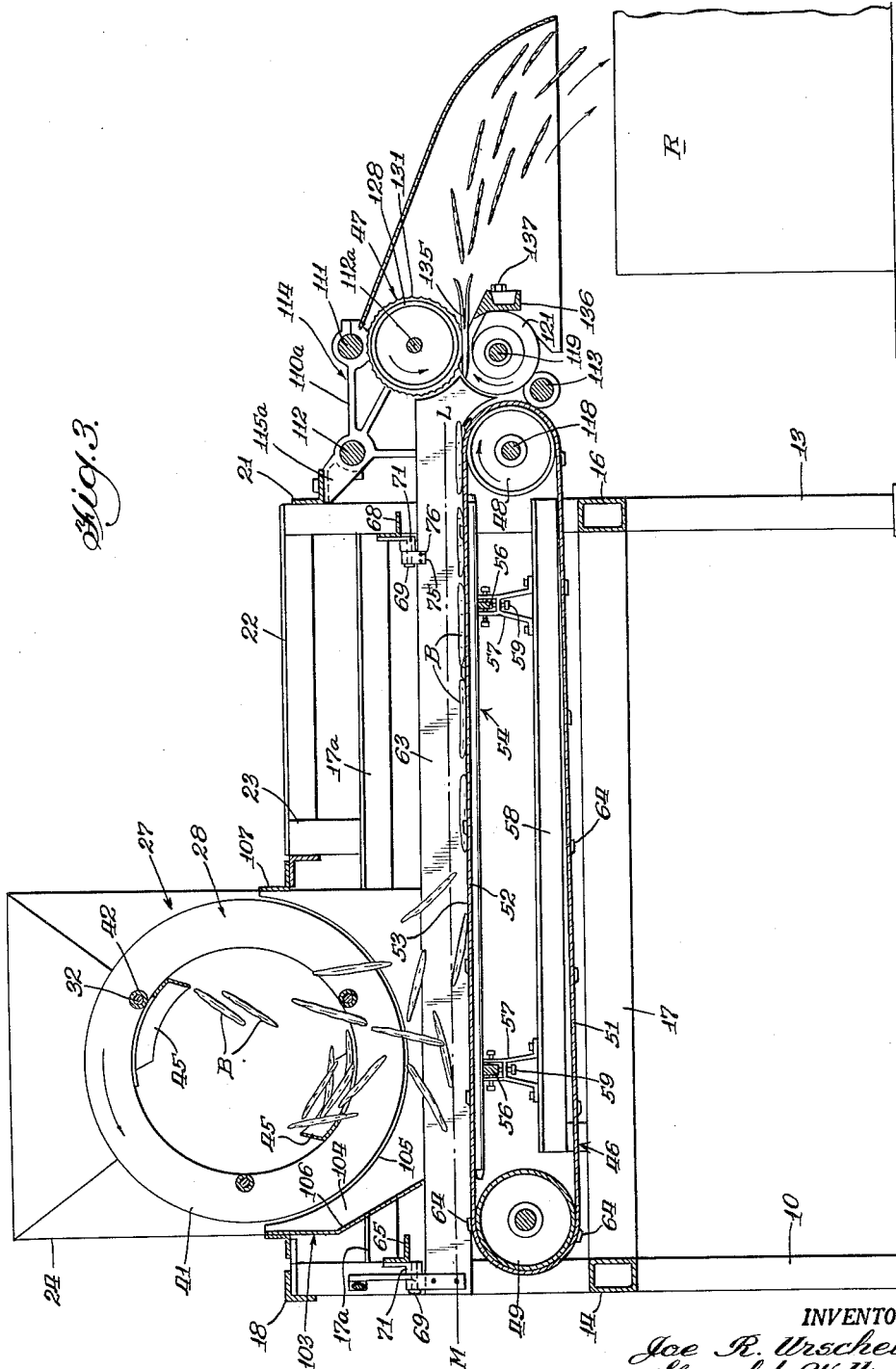

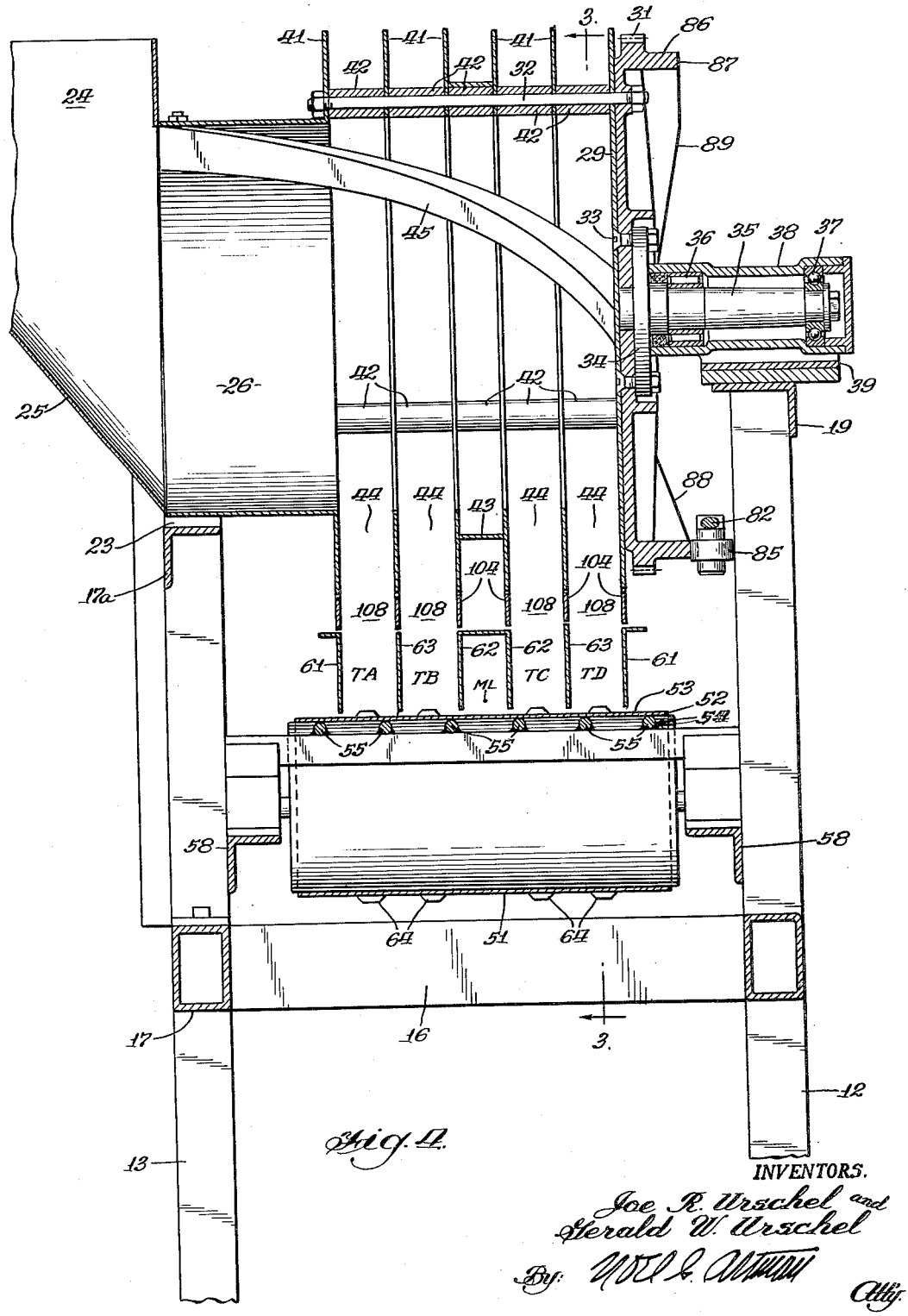

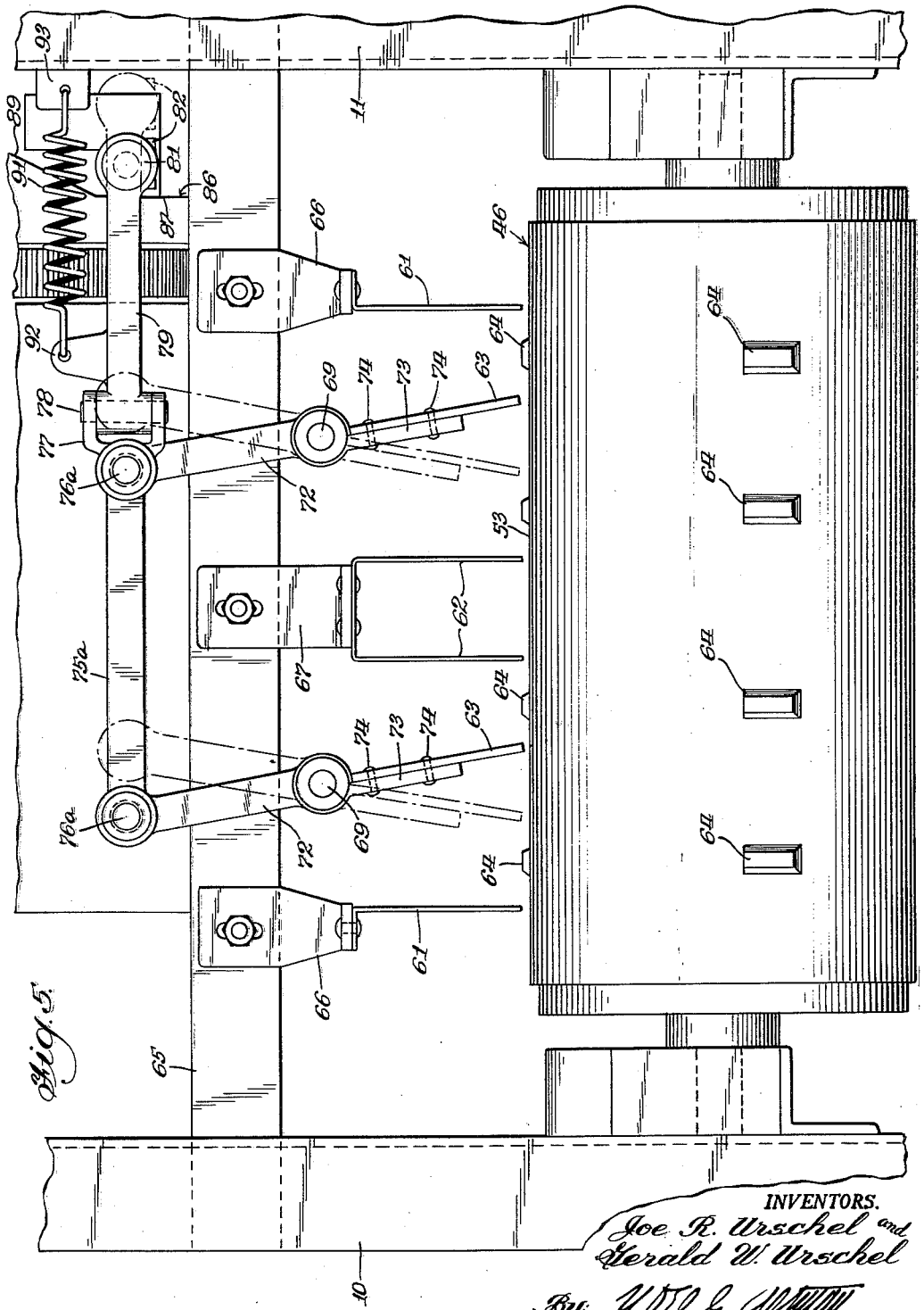

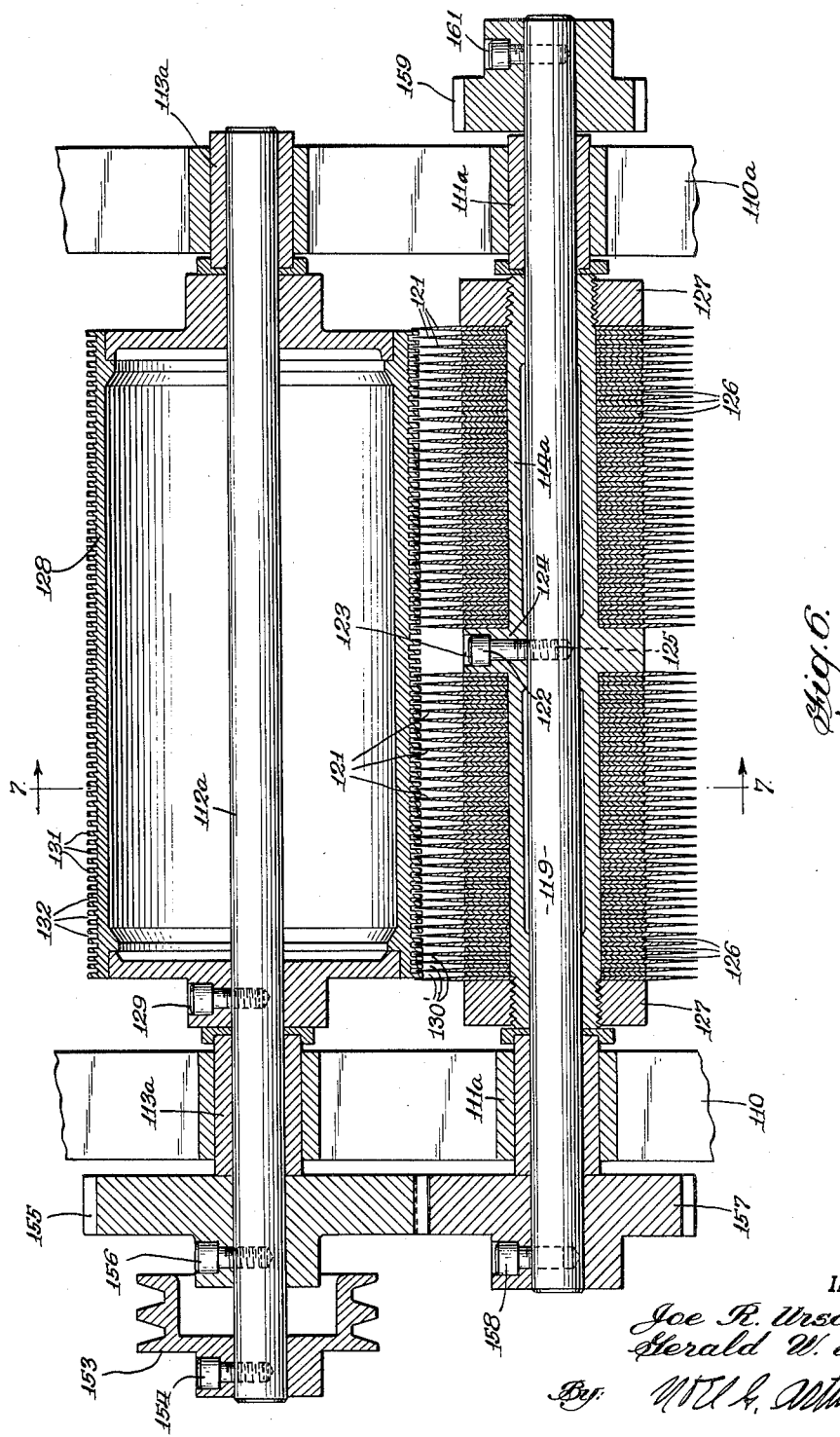

Sept. 11, 1962  J. R. URSCHEL ET AL  3,053,296
METHOD OF AND APPARATUS FOR SLITTING BEANS
Filed July 19, 1956  7 Sheets-Sheet 7

INVENTORS:
Joe R. Urschel and
Gerald W. Urschel 3,053,296
METHOD OF AND APPARATUS FOR SLITTING BEANS
Joe R. Urschel and Gerald W. Urschel, Valparaiso, Ind.
Filed July 19, 1956, Ser. No. 598,882
6 Claims. (Cl. 146—78)

This invention relates to machines for dividing elongated cuttable articles lengthwise into separate strips and more particularly concerns machines adapted to slit green or wax beans, which include elongated eatable pods, into such strips.

Bean slitting machines heretofore used in the canning industry have made longitudinal cuts in parallel planes through the beans. Consumer acceptance of this product is influenced by appearance, and processors consider it an improvement in appearance and quality for as high a percentage as possible of the strips slit from the beans to have a length approaching that of the bean from which they are cut and to have uniform width throughout most of their length. Short slivers and wedges lower the product value. To attain a better product according to this criterion the majority of canners have resorted to slitting only flat beans, despite the preference of many consumers for the texture and flavor of beans which are round in cross-section, which have a tendency to lie flat so conventional machines can make parallel cuts through a higher percentage of the flat sides. However a certain portion of the flat beans stand on edge while being sliced so the knives pass through these beans parallel with the flat sides, causing the beans to be cut in wide slabs. These slab particles of course greatly deteriorate the appearance of the product.

An important object of this invention is the provision of an improved bean slitting machine operable to cut the beans lengthwise in a plurality of laterally spaced parallel planes and to also cut the beans lengthwise in a plane at right angles to the first planes, thus adapting the machine to make exceedingly slender strips from green beans irrespective of whether they are flat or round.

A more specific object is the provision of a bean slitting mechanism adapted to endwise advance string beans while making a plurality of slit-forming cuts therethrough in parallel planes extending lengthwise through the beans, and having a slitting knife extending at right angles to the first planes to further slit the first-formed strips into additional narrower strips.

The objects of this invention also include the step of first lengthwise cutting a bean in a plurality of parallel planes followed by the step of simultaneously slitting the first-cut strips along a plane at right angles to the parallel planes.

A further object is the provision of an improved bean feeding means in the form of a cylinder rotatable about a substantially horizontal axis for tumbling beans about the interior thereof and having cylindrical side walls made up of annular plates spaced apart axially of the cylinder to form side wall openings therebetween through which the beans are dischargeable only when arranged substantially perpendicularly to the principal axis of the cylinder.

Still another object is the provision of bean conveyor troughs disposed beneath the cylinder according to the preceding object and directed perpendicularly to the axis of such cylinder respectively beneath the openings between the annular plates or ribs of such cylinder to facilitate the reception of the beans lengthwise into the troughs as they are discharged from the cylinder.

A further object is the provision of a bean slicing machine wherein there is a conveyor trough having side walls projecting upwardly from a conveyor surface forming the bottom of the trough and movable lengthwise thereof, and wherein the longitudinal walls of the trough are transversely relatively movable for engaging the beans therein and arranging them substantially parallel with the line of movement of the conveyor surface.

Still a further object is the provision of an improved bean slitting means comprising a cylindrical bank of disk knives axially spaced and forming a bite with a cooperating roller and into which beans that are endwise fed are slittable endwise by the knives and the roller as they pass through the bite, and a knife disposed within a plane parallel with the bite and in position to register with the slit bean strips as they issue from the bite to further slit them in a plane perpendicular to the planes in which they were cut by the disk knives.

The above and other desirable objects inherent in and encompassed by the invention are elucidated in the ensuing description, the appended claims, and the annexed drawings, wherein:

FIG. 2 is a side elevational view of the machine shown in FIG. 1.

FIG. 3 is an elevational sectional view taken longitudinally through the machine at the plane indicated by the line 3—3 in FIGS. 1 and 4, and includes an elevational view of a receptacle for the finished product discharged from the machine.

FIG. 4 is a vertical sectional view to an enlarged scale taken axially through a bean feeding cylinder of the machine, and with a portion of a hopper from which beans are fed into the cylinder being broken away.

FIG. 5 is a fragmentary end elevational view of the machine taken to an enlarged scale for illustrating conveyor troughs together with means for moving movable walls of these troughs.

FIG. 6 is a vertical sectional view taken to an enlarged scale at the plane indicated by the line 6—6 in FIG. 2, illustrating a bank of disk slitting knives and a companion roller cooperable therewith for effecting endwise slits through beans as they advance endwise through the bite formed between these knives and the roller.

Figure 1:
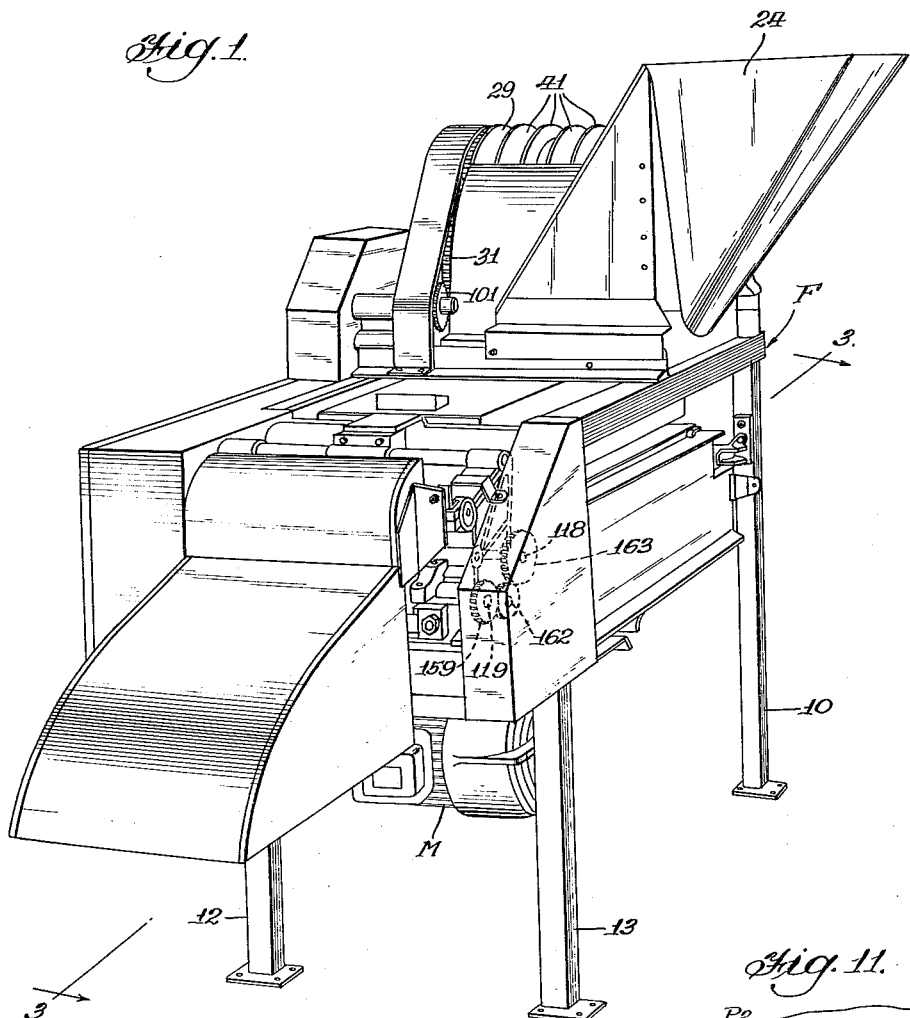
FIG. 1 is a perspective view of a machine constituting a preferred embodiment of the invention.

With continued reference to the drawings and particularly to FIGS. 1 through 4, the machine can be seen to comprise a skeleton frame F having four upright legs 10, 11, 12 and 13 at respective corners of the frame. Legs 10 and 11 are at the feeding end of the machine whereas 12 and 13 are at the discharge end thereof, and legs 10 and 13 are at the front side of the machine and legs 11 and 12 are at the rear side thereof. Midway from bottom to top the legs 10 and 11 are joined by a square sectioned tubular cross member 14 whereas the legs 11 and 12 are joined by a similar cross member 15, legs 12 and 13 by a similar cross member 16 and the legs 10 and 13 by a similar cross member 17. Legs 10 and 11 are joined at their upper ends by an angle frame member 18 whereas the legs 11 and 12 are joined at their upper ends by an angle frame member 19, the legs 12 and 13 by an angle frame member 21. An angle frame member 22, FIG. 3, joins the upper end of the leg 13 with the upper end of a vertical frame member 23 of which the lower end is mounted upon a horizontal cross member 17a connected between legs 10 and 13; see FIGS. 3 and 4.

String beans which are to be operated upon by the machine are deposited in a hopper 24 having a sloping bottom wall 25 which directs the beans downwardly and horizontally into a cylindrical vestibule 26 of a bean feeding means 27 comprising a cylinder 28. The cylinder 28 has a disk end plate 29 having a gear 31 secured upon its outer side by a plurality of bolts 32 near the perimeter of the plate and by a plurality of bolts 33 near the center of the plate. Bolts 33 also secure a flange 34 of a spindle 35 to the plate 29 and to the gear 31. This spindle 35 which is coaxial with the cylinder is journalled in antifriction bearing units 36 and 37 which are carried in a tubular portion 38 of a bearing bracket 39 mounted upon the horizontal machine frame member 19. In addition to the end plate 29, the bean feeding cylinder 28 comprises axially spaced circumscribing ribs in the form of annular plates 41 mounted on the bolts 32 and held in spaced relation by spacer sleeves 42 strung upon such bolts. A cylindrical reinforcing member 43 is disposed between the innermost annular members 41. Annular ribs 41 are spaced apart less distantly than the length of the beans to be operated upon by the machine so the beans are dischargeable from the feeding cylinder 28 only when their axes are arranged substantially perpendicularly to the principal axis of the cylinder. These discharged spaces between the annular ribs 41 are designated 44 in FIG. 4.

Power transmitted to the feeding cylinder 28 by way of the gear 31 causes rotation thereof counter-clockwise as viewed in FIG. 3 and during this rotation of the cylinder spiral impeller members 45 carry the beans part way up the rising side of the cylinder and allow them to drop to the bottom of the cylinder and during this process causes the beans to be advanced from the vestibule 26 inwardly for distribution throughout the length of the cylinder.

Conveyor means in the form of a belt 46 is for transferring the beans from the bean feeding means 27 to bean slitting means 47, FIG. 3, at the product end of the machine. This endless conveyor belt 46 which is carried by a driving roller 48 at the product discharge end of the machine and by an idler roller 49 at the feed end of the machine, has a lower flight 51 and an upper flight 52 of which the upper surface 53 constitutes a bean supporting and transfer surface. This upper flight 52 of the belt is supported against sag by a frame 54 comprising a plurality of straight rods 55 which extend lengthwise of the upper belt flight 52 in engagement with the underside thereof, and a pair of transverse members 56 extending transversely of the rods and supported in brackets 57 mounted on angle iron frame members 58 extending longitudinally of the machine; see FIGS. 2, 3 and 4. Set screws 59 in the brackets 57 are in direct support of the frame bars 56 and are rotatable for leveling and adjusting the height of the belt flight supporting frame 54.

Immediately above the upper flight of the belt 46 are a plurality of longitudinally extending conveyor trough walls, the outer of which, FIG. 4, are designated 61, the inner of which are designated 62, and intermediate walls between each set of walls 61 and 62 are each designated 63. These conveyor trough walls cooperate with the upper flight of the belt in forming respective conveyor troughs TA, TB, TC and TD. These troughs extend from beneath the bean feeding means 27 the entire distance to the bean slitting means 47 as is ascertainable from FIG. 3. The conveyor belt has four rows of lugs 64 projecting outwardly from its outer periphery, the lugs being spaced apart slightly in excess of the length of the beans to be operated on by the machine and the rows respectively aligning with the troughs TA, TB, TC and TD for catching against beans deposited in these troughs and to faciliate the belt accelerating the beans up to the belt speed. During rotation of the belt 46, the bean supporting and transfer surface 53 thereof moves lengthwise of a median line ML shown longitudinally in FIG. 3 and appearing as a point in FIG. 4 between the conveyor trough walls 62.

At the feeding end of the machine the walls 61 are rigidly supported from a transverse frame member 65 by means of respective adjustable brackets 66; see FIGS. 2 and 5. The center trough walls 62 are supported from the transverse frame member 65 by an adjustable bracket 67. Brackets similar to the brackets 66 and 67 are employed at the product discharge end of the machine for supporting the trough walls 61 and 62 from a frame cross member 68. Trough walls 63 are swingably mounted upon pivot pins 69 adjacent their opposite ends. At the feeding end of the machine the pins 69 are carried by brackets 71 depending from the frame cross member 65. Trough wall pivoting levers 72 are pivotally mounted upon the pins 69 and lower end portions 73 of these levers have the trough walls 63 fastened thereto by rivets 74. At the product discharge end of the machine the pins 69, mounted by brackets 71 on frame member 68, pivotally carry arms 75 to which the trough walls 63 are secured by rivets 76.

The upper ends of levers 72, FIGS. 3 and 5, are pivotally connected to a link 75a by pivot pins 76a. The link 75a has vertically spaced furcations 77 at its right end, FIG. 5, in which there is a pin 78 pivotally connecting with one end of a pitman rod 79. A headed bearing pin 81 having a horizontal axis pivotally connects the other end of the pitman rod 79 with one end of an operating lever 82, the left end thereof as shown in FIG. 2. This lever 82 is pivoted about a vertical axis in a pivot pin 83 therefor in a bracket 84 depending from the horizontal frame member 19. The right end of operating lever 82, FIG. 2, has a cam follower roller 85 journalled thereon in position to register with an annular cam 86 formed integrally with the gear 31, FIGS. 2 and 4. Cam 86 has two diametrically opposite cam lobes 87 each of 90 degrees duration. Each cam lobe has a rise ramp portion 88 associated therewith and a fall ramp portion 89. A spring 91, FIG. 5, connected between an ear 92 on the pitman rod 79 and an ear 93 on the frame leg 11 urges the trough wall pivoting levers 72 into their dot-dash line position shown in FIG. 5 and urges the cam-operated lever 82, FIG. 2, to pivot counter-clockwise about the pivot 83, as viewed from above, to maintain the cam follower roller 85 against the profile of the annular cam 86.

Power for rotating the bean feeding cylinder 28, the gear 31 and the cam 86 is received from an electric motor M, FIGS. 1 and 2, secured to the underside of the machine frame. A pulley 94 on the armature shaft 95 of motor M transmits driving force to a pulley 96 by means of a belt 97. Pulley 96 is fixed for rotation with a shaft 97a journalled in a bearing block 98 mounted on the horizontal frame member 19. Also journalled in the bearing block 98 is a shaft 99 on which there is mounted an idler gear 101 which meshes with and is driven by a gear 102 driven by the shaft 97a. Idler gear 101 meshes with and drives the large gear 31 with which the bean feeding cylinder 28 is constrained for rotation.

Immediately below the bean feeding cylinder 28 is a feed box 103 comprising a plurality of feed passage partition plates 104, FIGS. 3 and 4. These plates 104 respectively align vertically with the annular ribs 41 of the bean feeding cylinder 28, and in their upper edges have large semi-circular notches 105 of slightly greater radius than the outer perimeters of the ribs 41 to partially embrace them. The left edges of the feed box partition plates 104 as seen in FIG. 3 are secured to an end wall 106 of the feed box 103 whereas the opposite ends of these plates are secured to an angle frame member 107. Feed passages 108 formed between the feed box partition plates 104 respectively register with the discharge passages 44 of the bean feeding cylinder and with the conveyor troughs TA, TB, TC and TD, as is ascertainable from FIG. 4. Feed box plates 104 which are in superposed proximity with the troughs TA, TB, TC and TD, cooperate with the feeding means ribs or plates 41 for arranging the beans to extend at least partially lengthwise of the troughs to facilitate the beans entering between the trough walls where the beans are engageable by the bean supporting and transfer surface 53 of the belt flight 52 for endwise transfer to the bean slitting means 47, FIG. 3.

The bean slitting means is carried by substantially identical skeleton frame structures 110 and 110a, FIGS. 2 and 3, secured together by transverse rods 111, 112 and 113 to form a slitting means frame 114. This frame 114 is mounted upon the product discharge end of the main frame F by a pair of brackets 115 and 115a mounted adjacent the ends of the rod 112 and secured to the transverse frame member 21 by cap screws 116. Additional mounting brackets 117 of which one is shown in FIG. 2 are secured respectively between the frame structure 110 and the leg 12 and between the frame structure 110a and the frame leg 13. A shaft 118 of the belt driving roller 48 extends between and is journalled at end portions thereof in the frame structures 110 and 110a. Two additional shafts, 119 and 112a, FIGS. 2, 3 and 6, extend between and are journalled in the frame structures 110 and 110a. Shaft 119 is journalled in bearings 111a whereas shaft 112a is journalled in bearings 113a.

Shaft 119 carries a disk knife mounting sleeve 114a for a bank of bean-slitting disk knives 121. This mounting sleeve has a central radial flange 124 containing a radial bore 123 in which there is a set screw 122 rotated into a threaded recess 125 in the shaft 119 to secure the sleeve for rotation with the shaft. One group of the disk knives 121 are slid onto the left end of the mounting sleeve 114a alternately with annular spacer members 126 and held in position between the flange 124 and a nut 127 turned on to the left end of the sleeve, FIG. 6. A second nut 127 on the right end of the sleeve 114a compresses a second group of the slitting knives 121 and their spacers 126 against the right end of the flange 124. The nuts 127 and the flange 124 grip the bank of slicing knives 121 to hold them nonrotatively with respect to the sleeve 114 wherefore these knives are caused to rotate with the shaft 119.

Figure 7:
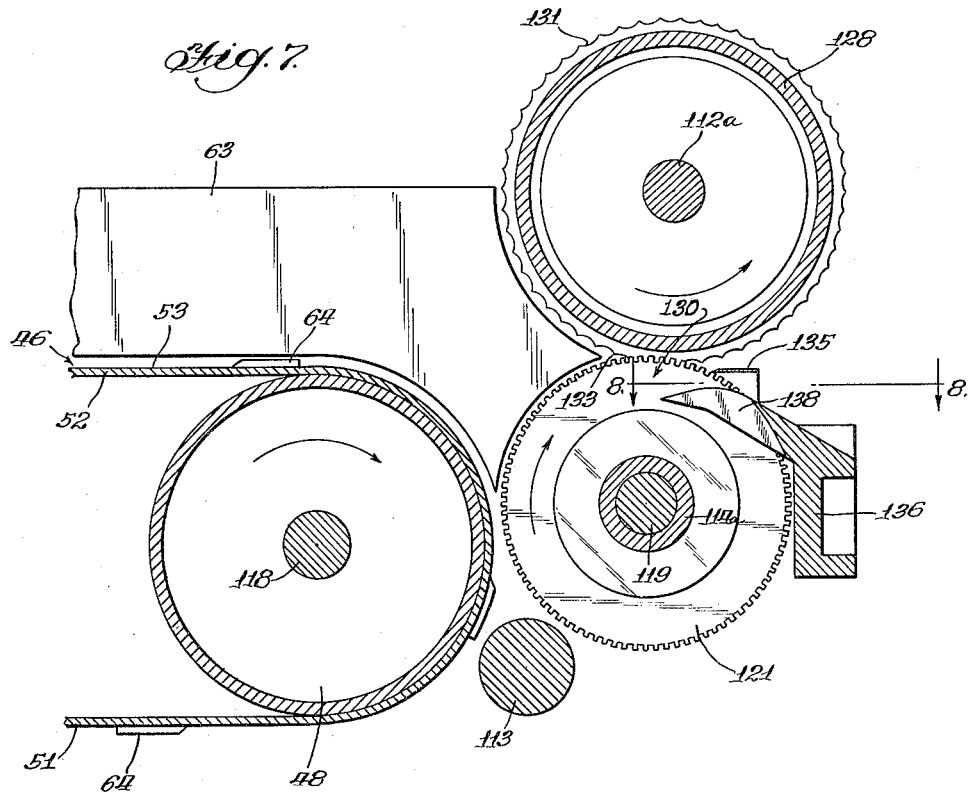
FIG. 7 is a fragmentary sectional view taken at a plane coinciding with the line 7—7 of FIG. 6.

A bean slitting roller 128 which is complemental to the bank of slitting knives 121 is secured to the shaft 112a by a set screw 129. The cylindrical periphery of this roller is circumscribed by small annular bean-gripping ribs 131 between which there are annular grooves 132. Shafts 119 and 112a are in such proximity that the knives 121 extend into the grooves 132 as shown in FIG. 6. The circular periphery of the ribs 131 is serrated as illustrated in FIG. 7. Also the cutting edges of the disk knives 121 are serrated as shown in FIG. 7. In FIG. 7 it can be seen that the bank of knives 121 and the roller 128 form a bite 133 into which the beans are directed endwise, and the serrations upon the ribs 131 and upon the circular cutting edges of the knives 121 press into the beans and expedite pulling them endwise between the knives and the roller as they are cut into strips.

Figure 10:
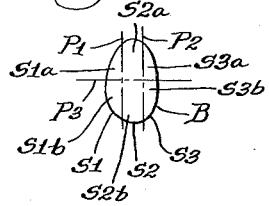
FIG. 10 is a view taken at the line 10—10 of FIG. 9 illustrating by vertical dot-dash lines the laterally spaced planes at which the disk knives would cut the bean and also illustrating by a horizontal dot-dash line the plane at which the bean is further split by the knife shown in FIGS. 3, 7 and 8 as the beans emerge from the bite between the disk knives and the companion roller.
Figure 9:
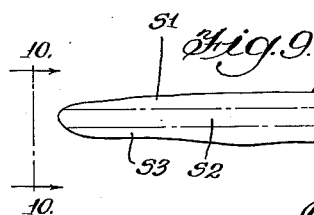
FIG. 9 is a plan view of a bean traversed endwise by laterally spaced dot-dash lines marking the position of parallel planes at which the disk knives of the machine typically would cut the bean.
Figure 11:
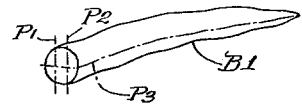
FIG. 11 is a perspective view of a bean fragment to illustrate the condition when a bean is first cut by the disk knives in planes parallel to the minor transverse axis of the bean and subsequently cut by the single knife at a plane substantially coinciding with the major axis of the transverse section of the bean.

The axial spacing of the knives 121 corresponds to the spacing of the planes $P^1$ and $P^2$ illustrated by dot-dash lines in FIGS. 9, 10 and 11 where these planes are associated with beans B and $B^1$. Thus the knives are spaced in such manner as to make two parallel cuts lengthwise through a normal size bean. As the beans emerge from the discharge side of the bite between the bank of knives 121 and the complemental roller 128, they are also cut at a plane $P^3$ shows in FIGS. 10 and 11 which is at right angles to the planes $P^1$ and $P^2$. Such cutting of the beans at the plane $P^3$ is accomplished by a straight slitting knife 135, FIGS. 7 and 8. This knife occupies a plane parallel with the common principal axis of the disk knives and coincidently parallel with the longintudinal axes of the bean strips $S^1$, $S^2$, $S^3$, FIG. 10, as they emerge from the discharge side of the bite 133 to axially penetrate such strips at the plane $P^3$ for longitudinally slitting them into additional separate strips $S^{1a}$, $S^{1b}$, $S^{2a}$, $S^{2b}$, $S^{3a}$ and $S^{3b}$.

Also shown in FIG. 7 and in FIG. 3 is a bean stripper bar 136 extending between the frame structures 110 and 110a where it is held by cap screws 137. This bar has stripper members in the form of fingers 138 formed integrally therewith and extending between the disk knives 121 for deflecting the cut bean strips $S^1$, $S^2$, $S^3$, FIGS. 9 and 10, from between the knives 121 and guiding such strips into registration with the straight slitting knife 135 so that this knife is effective for further slitting these strips in the manner illustrated in FIG. 3 and at the plane $P^3$, FIG. 10. In FIG. 7 there is shown a passageway 130 through which slit portions of the beans are advanced by the disk knives 121 and the roller ribs 131. This passageway is formed of a plurality of portions 130', FIG. 6, of which each lies between adjacent spaced knives 121, spacer means 126 which spaces these knives and a rib 131 projecting between these two knives. The stripper fingers 138 project into the discharge side of these passageway portions.

Figure 8:
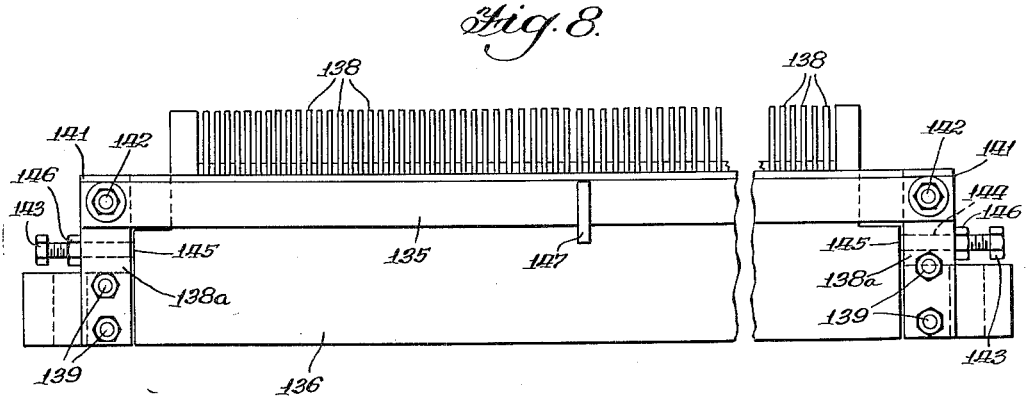
FIG. 8 is a horizontal view taken at the line 8—8 of FIG. 7 to illustrate the mounting of the knife for endwise slitting the beans in a plane perpendicularly to the planes of the disk knives as the beans emerge from the bite between the disk knives and the companion slitting roller.

In FIG. 8 it can be seen that the stripper bar 136 has knife holder members 138a mounted thereon by means of cap screws 139, there being two such cap screws associated with each of the members 138a. Holes, not shown, in the members 138a for the shanks of the cap screws 139 are over-size with respect to such shanks to facilitate spreading apart of the ends 141 of the members 138a to which opposite ends of the straight slitting knife 135 are secured by screws 142. Cap screws 143 threaded through holes 144 in the members 138a are adapted to bear against shoulders 145 of the bar 136 so that when these cap screws 143 are advanced into the holes 144 against these shoulders they can force the members 138a apart at their ends 141 for obtaining desired tensioning of the thin knife 135. Lock nuts 146 on the cap screws 143 maintain the desired adjustment. A center brace arm 147 for the knife 135 extends from the bar 136 into engagement with the knife. A slot, not shown, in the brace 147 receives the body of the knife 135. To enable the knife 135 to slice endwise through the bean slices $S^1$, $S^2$ and $S^3$ which are very slender and fragile, it is essential that the knife be so thin that it is flexible and incapable of self support in a plane unless drawn taut by the knife holders 138a. The brace 147 supplements the holders 138a in maintaining the accurate position of the knife.

Power for driving the slitting roller 128 is received from the motor M, FIG. 2, by way of a pulley 151 on the motor armature shaft 95, a belt 152 and a pulley 153 on an end of the shaft 112a, FIGS. 2 and 6. Pulley 153 is secured to the shaft 112 by a set screw 154. A gear 155 is secured to the shaft 112 by a set screw 156, FIG. 6, and this gear meshes with a gear 157 which is secured to the disk knife driving shaft 119 by set screw 158. In FIGS. 6 and 1 the right end of the slitting knife shaft 119 can be seen to have a gear 159 mounted thereon by a set screw 161. This gear 159 provides drive to the conveyor belt driving drum shaft 118 through an idler gear 162, FIG. 1, and a gear 163 secured to the right end of the shaft 118, FIGS. 1 and 3.

Operation of the Machine

The machine is placed in operation by starting the electric motor M. Power from the motor for driving the feeding drum 28 is transmitted through an armature-mounted pulley 94, belt 97, pulley 96, gear 102, idler gear 101 and the gear 31 on the closed end of the cylinder 28. The motor is normally operated at such a speed that this drive for the bean feeding cylinder causes it to rotate at approximately 40 r.p.m. Power for driving the bean slitting drum 128 is transmitted from the motor through an armature shaft pulley 151, belt 152 and pulley 153, FIGS. 2 and 6, which is secured to one end of the drum driving shaft 112a by a set screw 154. Gears 155 and 157 respectively secured to the drum driving shaft 112a and to the disk knife driving shaft 119 transmit driving force from the shaft 112a to the bank of disk knives 121. A gear 159 on the right end of the knife bank driving shaft 119, FIGS. 1 and 6, transmits power to the driving roller 48 for the bean feeding belt 46 through an idler gear 162, FIG. 1, and a gear 163 secured to the shaft 118 upon which the belt driving drum 48 is secured. These driving trains between the motor M, the bean feeding cylinder 28, the bean slitting drum 128, the disk knives 121 and the driving roller 48 for the bean feeding belt 46, are so coordinated in driving speed ratio that when the feeding cylinder 28 is driven at 39 r.p.m., the feed belt 46 will rotate at a speed of 2150 feet per minute, and the drum 128 and the slitting knives 121 will have a peripheral speed of 2590 feet per minute.

After the machine has been set in motion, green pod beans can be fed into the receiving hopper 24 where they will slide down the bottom wall 25 into the cylindrical vestibule 26 which rotates with the bean feeding cylinder 28 of which it is a part. The spiral impellers 45 inside the bean feeding cylinder 28 progress these beans from the vestibule into the circumferential ribbed portion of the cylinder where they are tumbled about and are permitted to feed downwardly from the cylinder through the annular discharge spaces 44 between the ribs 41. Since these discharge spaces 44 are of less width axially of the cylinder than the length of the beans, it is necessary that the beans approximately align themselves within planes parallel with the longitudinal axis of the feeding troughs TA, TB, TC and TD before they are discharged from the cylinder. The walls 108 of the feed box 103 cooperate with the annular ribs 41 of the feeding cylinder for arranging the beans to extend at least partially lengthwise of the troughs to facilitate their entering between the trough walls. This eliminates a bottleneck in the progress of the beans through the machine and enables the machine to operate at faster speed.

Beans entering the troughs TA, TB, TC and TD are quickly accelerated to the speed of the belt flight 52, which acceleration is expedited by the belt lugs 64. During movement of the beans in the troughs toward the slitting mechanism 47, these beans are swept laterally in the troughs to more nearly perfect their position of parallelism therewith. The trough walls 63 which are pivotally supported by pins 69 adjacent their upper edges constitute the means for laterally sweeping the beans. This lateral sweeping motion is imparted to the trough walls 63 by the diametrically opposite cam lobes 87 on the annular cam 86, FIGS. 2, 4 and 5, coaxial with and on the closed end of the bean feeding cylinder 28. When the cam follower roller 85 FIGS. 2 and 4 registers with the crest of either cam lobe 87 the lever 82 operated by the roller 85 will be pivoted in the position shown by the broken lines in FIG. 5 and to be operable through the pitman 79 and the link 75a to pivot the trough wall swinging levers 72 into their broken line positions. When the roller 85 is midway on either cam lobe ramp 88 or 89 the lever 82 will be pivoted in a position to cause the wall-swinging levers 72 and the trough walls 63 to be in an upright position midway between their associated trough walls 61 and 62. When the cam follower roller 85 is on a portion of the cam profile between the lobes 87, the lever 82 will be in the full line position shown in FIG. 5 as will the levers 72 and trough walls 63.

Since there are two of the cam lobes 87, the cyclical sweeping motion imparted to the trough walls 63 by these cam lobes incurs two complete excursive sweeping movements of the walls 63 alternately toward each of the walls 61 and 62 and back to a neutral position during each rotation of the feeding cylinder 28. This is at sufficient frequency for the walls 63 to impart an axially aligning sweeping motion to the beans as they are moved along the troughs toward the bean slitting means 47.

When the beans arrive at the disk slitting knives 121 where they are fed endwise into the bite between these knives and the ribs 131 of the roller 128, see FIGS. 3 and 7, two adjacent knives 121 will cut into the beans at parallel planes $P^1$ and $P^2$, FIGS. 9 and 10. The serrated ribs 131 meshing with serrated knife edges thus cutting into the beans will press the beans radially onto the knives to completely penetrate the beans by the knives as they pass through the bite 133. Since the peripheral speed of the knives 121 and the ribs 131 is slightly in excess of the speed at which the beans approach the bite 133 when these ribs and knives initially grasp the leading ends of the beans, such ends are quickly accelerated, causing the beans to swing their trailing ends of any that are out of the line of movement more proximately into such line of movement. While the beans are being cut by the knives 121 and as the leading ends of the beans emerge from the discharge side of the bite 133, these leading ends of the three initial strips $S^1$, $S^2$ and $S^3$, FIG. 10, are deflected from between the knives 121 by the stripper members or fingers 138, FIGS. 3, 7 and 8, so their longitudinal axes and the plane $P^3$ coincide with the plane of the straight flat slitting knife 135 which is effective for slitting the initially formed strip $S^1$ into further strips $S^{1a}$ and $S^{1b}$, the initially formed strip $S^2$ into the further strips $S^{2a}$ and $S^{2b}$ and the strip $S^3$ into the further strips $S^{3a}$ and $S^{3b}$.

The stripper fingers 138 are in such close proximity to the ribs 131 of the stripping roller 128 that these ribs press the bean strips $S^1$, $S^2$ and $S^3$ against the upper edges of the fingers 138 whereby these fingers and the serrated ribs 131 are cooperable in propelling the bean strips and guiding them accurately into the knife 135 so it can effectively cut these already extremely slender and frail strips $S^1$, $S^2$ and $S^3$ into the still narrower strips. The knives 121 cut foremost through the beans wereas the knife 135, while cutting the beans simultaneously in part with the knives 121, effects its cutting in delayed time phase to the foremost cutting. By thus delaying the time of initial contact of the knife 135 with the bean until after the knives 121 have entered the bean, there is progressive knife contact to avoid a transient initial peak shock force upon the bean with assurance the bean is not broken or shattered which would frustrate the slitting operation. The finished product may be discharged into a receptacle as that indicated at R in FIG. 3.

FIGS. 9 and 10 illustrate the association of planes $P^1$ and $P^2$ of disk knives 121 with a bean introduced to such knives while the major axis of the bean's transverse section is in an upright position. FIG. 11 illustrates a bean fragment with relation to the planes $P^1$ and $P^2$ when the bean is introduced endwise to the bean slicing knives while lying flat upon the conveyor belt, that is, with the minor axis of a cross-section thereof disposed vertically. The machine is adapted to operate upon the beans irrespective of their rotative position about their principal axis.

Having described a single preferred embodiment of the invention with the view of clearly and concisely illustrating the same, we claim:

1. In a green bean slitting machine, a bank of disk knives having respective circular cutting edges spaced apart lengthwise of a common principal axis about which such knives are rotatable, spacer means located between said disk knives, a feeding roller having circumferential bean-feeding ribs spaced apart axially thereof at intervals of spacing corresponding to the axial spacing of the circular knife edges, said roller being rotatable about its principal axis which is parallel with and spaced from the knife axis a distance causing the knife cutting edges and the ribs to overlap edge portions in meshed relation and thus form a bean-receiving bite and bean passageway between the knives, the spacer means and the ribs, means for rotating the knives and roller in opposite respective directions to advance the overlapping portions of the knife edges and ribs from an entry side of the bite and passageway to a discharge side thereof, the rotating knives and roller being operable to grip beans fed endwise into the entry side of the bite and thereupon complementally move such beans endwise between the knives and rollers attendant to the ribs pressing the beans radially onto the knives to divide the beans into separate strips and discharge such strips endwise from the discharge side of the bite, and a thin slitting knife disposed on the discharge side of the bite substantially within a plane parallel with the disk knife axis and adjacent to said bite and in registry with said passageway to axially penetrate the cut bean strips for longitudinally slitting them into additional separate strips as they emerge from the discharge side of the passageway.

2. The combination set forth in claim 1, wherein the knife is in the form of a thin flexibile strip extendng lengthwise of the knife bank and of the feeding roller in proximity wtih the discharge side of the bite, said knife having opposite end portions respectively adjacent opposite ends of the knife bank, and anchorages respectively for the knife end portions and adjustably spreadable lengthwise of the knife to create tension therein.

3. The combination set forth in claim 1, wherein there are knife tripper members disposed between the knives on the discharge side of said bite and on the opposite side of the plane of the thin slitting knife with respect to the meshed edge portions of the bean-feeding roller ribs, and said stripper members being in such proximity with such slitting knife and the bite to guide the strips from between the disk knives against such slitting knife.

4. The combination set forth in claim 3, wherein said stripper members and the meshed edge portions of the bean-feeding roller ribs are in such proximity as to complementally grip the strips being cut by the disk knives and complementally feed and guide such strips endwise against the slitting knife.

5. In a green bean slitting machine, disk knife means rotatable about a principal axis thereof and having circular cutting edge means, annular bean feeding rib means disposed contiguously with the disk knife means and rotatable about a principal axis thereof parallel with the knife means axis and spaced therefrom a distance disposing portions of the cutting edge means in meshed overlapping relation with edge portions of the rib means and thus form therewith a bean-receiving bite and sides of bean passageway portions between the rib means and the knife means axis, means for rotating the knife means in one direction about its axis and for rotating the rib means in the opposite direction about its axis to advance said overlapping portions of the knife means and rib means from an entry side of the bite and passageway portions to a discharge side thereof, the rotating knife means and rib means being adapted to frictionally engage a bean fed endwise into the bite and thereupon complementally move the bean endwise therebetween attendant to the rib means pressing the bean radially onto the knife means to divide the bean into lengthwise strips respectively in the passageway portions and to discharge the strips endwise from the discharge side of the bite and passageway portions, and a slitting knife disposed on the discharge side of said bite in a plane substantially parallel with the knife means axis and in contiguous registry with the passageway portions to axially penetrate the bean strips for longitudinally slitting them into additional separate strips pursuant to their discharge from said passageway portions.

6. The method of slitting an elongated green bean into a plurality of separate elongated strips, comprising the step of cutting foremost through the bean progressively endwise from one end to the opposite end in a plurality of laterally-spaced parallel planes axially intersecting the bean while rapidly endwise propelling the bean in uninterrupted movement with said one end in advance to contribute to said cutting and divide separate strips from the bean, and the further step of lengthwise slitting the strips progressively from the one end of the bean to the opposite end thereof partially during the foremost cutting though in delayed time phase relation to the foremost cutting and along a plane axially intersecting such strips at substantially right angles to the parallel planes to divide such strips into additional strips.

References Cited in the file of this patent

UNITED STATES PATENTS

| | | |
|---|---|---|
| 1,263,151 | Topalian | Apr. 16, 1918 |
| 1,351,088 | Vaudreuil | Aug. 31, 1920 |
| 1,670,084 | Taylor | May 15, 1928 |
| 1,710,421 | Jorgenson | Apr. 23, 1929 |
| 1,948,905 | Duckworth | Feb. 27, 1934 |
| 2,065,239 | Mills | Dec. 22, 1936 |
| 2,088,383 | Miller | July 27, 1937 |
| 2,100,021 | Bell | Nov. 23, 1937 |
| 2,109,303 | Ogletree | Feb. 22, 1938 |
| 2,160,693 | Anstice | May 30, 1939 |
| 2,221,699 | Buck | Nov. 12, 1940 |
| 2,241,978 | Buck | May 13, 1941 |
| 2,242,557 | Urschel et al. | May 20, 1941 |
| 2,290,812 | Norman | July 21, 1942 |
| 2,333,576 | Kerr | Nov. 2, 1943 |
| 2,350,586 | Carroll | June 6, 1944 |
| 2,758,697 | Schultz | Aug. 14, 1956 |

FOREIGN PATENTS

| | | |
|---|---|---|
| 214,393 | Germany | Oct. 11, 1909 |